METHOD OF MAKING SPHERE-PASSING TEES FOR PIPING SYSTEMS

This invention relates to sphere-passing tees, for example for use in pipe-work systems employed by the oil or gas industry.

In the oil industry, for example, a plastics sphere may be inserted into a pipeline to maintain a degree of separation between one batch of oil and a second batch fed into the pipeline immediately after the first batch, and also to provide a certain amount of cleaning as the sphere passes along the pipe-line. To prevent such a sphere from entering a branch pipe, which leads off laterally from a main run of the pipeline, the branch outlet from the main pipe run may be barred over, but there is sometimes a considerable danger that such a sphere may then "stall" in the main pipe run at the location of the branch outlet.

To reduce the danger of such stalling of a sphere in the pipeline, it is known to effect the connection of the branch line to the main pipe run by means of a structure known as a sphere-passing tee. This structure generally comprises an inner tube, for connection in the main pipe run, formed with outlet apertures intermediate its two ends, and an outer tube which surrounds the sphere-guiding tube coaxially and is welded therearound at its two ends. The outer tube is provided with a branch outlet for connection to the branch line.

Conventionally the outer tube of such a sphere-passing tee is constructed of a plurality of forged or otherwise prefabricated components by welding, the connection of the outer tube to the sphere-guiding tube being also effected by welding. Some of the welds used are subject to full pipeline pressure, thus presenting areas of potential defect. In addition, the use of a plurality of prefabricated components to form the outer tube, and the number of high quality welding processes necessary to assemble these prefabricated components together satisfactorily, tends to make such conventional sphere-passing tees rather expensive.

An embodiment of the present invention can provide a sphere-passing tee in which the sphere-guiding tube is held within the outer tube, at least at one end thereof, without the need for a weld able to withstand full pipeline pressure without leaking.

According to one aspect of the present invention there is provided a method of manufacturing a sphere-passing tee for connection in a pipe-line of a specified internal diameter, which method comprises:

subjecting a one-piece metal outer tube, of an internal diameter larger than the said specified internal diameter and provided with a branch outlet at a location intermediate the two ends of the tube, to a die forming process for reducing the diameter of a first length of said outer tube, adjacent to one end thereof, so that the said first length is made to taper towards that end and so that the internal diameter of the tube at the said one end is brought to a value smaller than the said specified internal diameter;

positioning a sphere-guiding tube, of outside diameter less than the said internal diameter of said outer tube and of internal diameter equal to the said specified internal diameter and having fluid outlet apertures intermediate its two ends, coaxially within said outer tube so that one end of said sphere-guiding tube abuts against the interior of the reduced-diameter first length of said outer tube; said sphere-guiding tube being of a length, less than that of said outer tube, such that, when the said one end of said sphere-guiding tube abuts against the said interior, the other end of said sphere-guiding tube is located adjacent to but inward of the other end of the said outer tube;

employing a die forming process to reduce the diameter of a second length of said outer tube, adjacent to the other end thereof, so that the said second length is made to taper towards that other end and so that the internal diameter of said outer tube at its said other end is brought to a value smaller than the said specified internal diameter, and so that the interior of the said second length is brought into contact with the other end of said sphere-guiding tube, whereby said outer tube and said sphere-guiding tube are fixed coaxially against movement relative to one another; and after said die forming processes, removing inner portions of said outer tube, at each end thereof, to increase the internal diameter thereof to the said specified internal diameter, and cutting a weld preparation onto each end of said outer tube.

According to a second aspect of the present invention there is provided a sphere-passing tee, for connection in a pipe-line of a specified internal diameter, comprising:

a one-piece metal outer tube having a branch outlet at a location, intermediate the two ends of the tube, at which the tube has an internal diameter larger than the said specified internal diameter;

a first length of said outer tube, adjacent to one end thereof, being reduced in diameter so that the said first length tapers towards that one end and the internal diameter of the tube at the said one end is substantially equal to the said specified internal diameter;

a sphere-guiding tube, of external diameter less than the internal diameter of said outer tube at said location and of internal diameter equal to the said specified internal diameter and having fluid outlet apertures intermedaite its two ends;

said sphere-guiding tube having one end abutting against the interior of the reduced-diameter first length of said outer tube and extending coaxially within the said outer tube from its said one end towards the other end of the outer tube to a second location that is more remote from the said first length than is the said location of the branch outlet; and said outer tube and said sphere-guiding tube being held coaxially against movement relative to one another at the said second location.

Preferably, the said branch outlet is provided by an extrusion process. Preferably also the sphere-guiding tube is shorter than the outer tube so that, with the said one end of the sphere-guiding tube abutting against the said interior, the other end of said sphere-guiding tube is positioned adjacent to but inward of the other end of the said outer tube, and a second length of said outer tube, adjacent to the other end thereof, is reduced in diameter by a die forming process so that the said second length tapers towards that other end, and so that the internal diameter of said outer tube at its said other end is brought to a value not greater than the said specified internal diameter, and so that the interior of the said second length is brought into contact with the said other end of said sphere-guiding tube; the said other end of said sphere-guiding tube can then be welded to the said interior of the reduced-diameter second length of said outer tube.

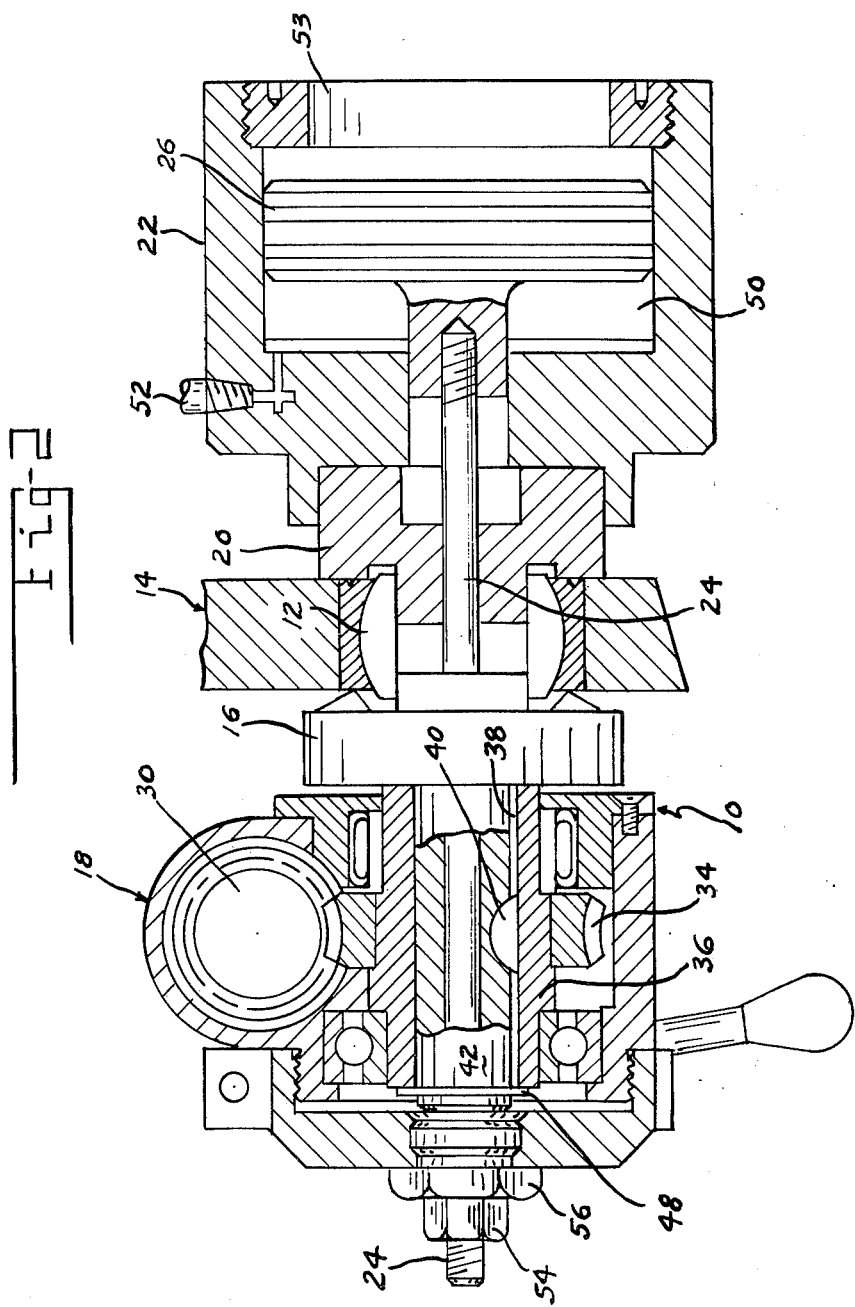

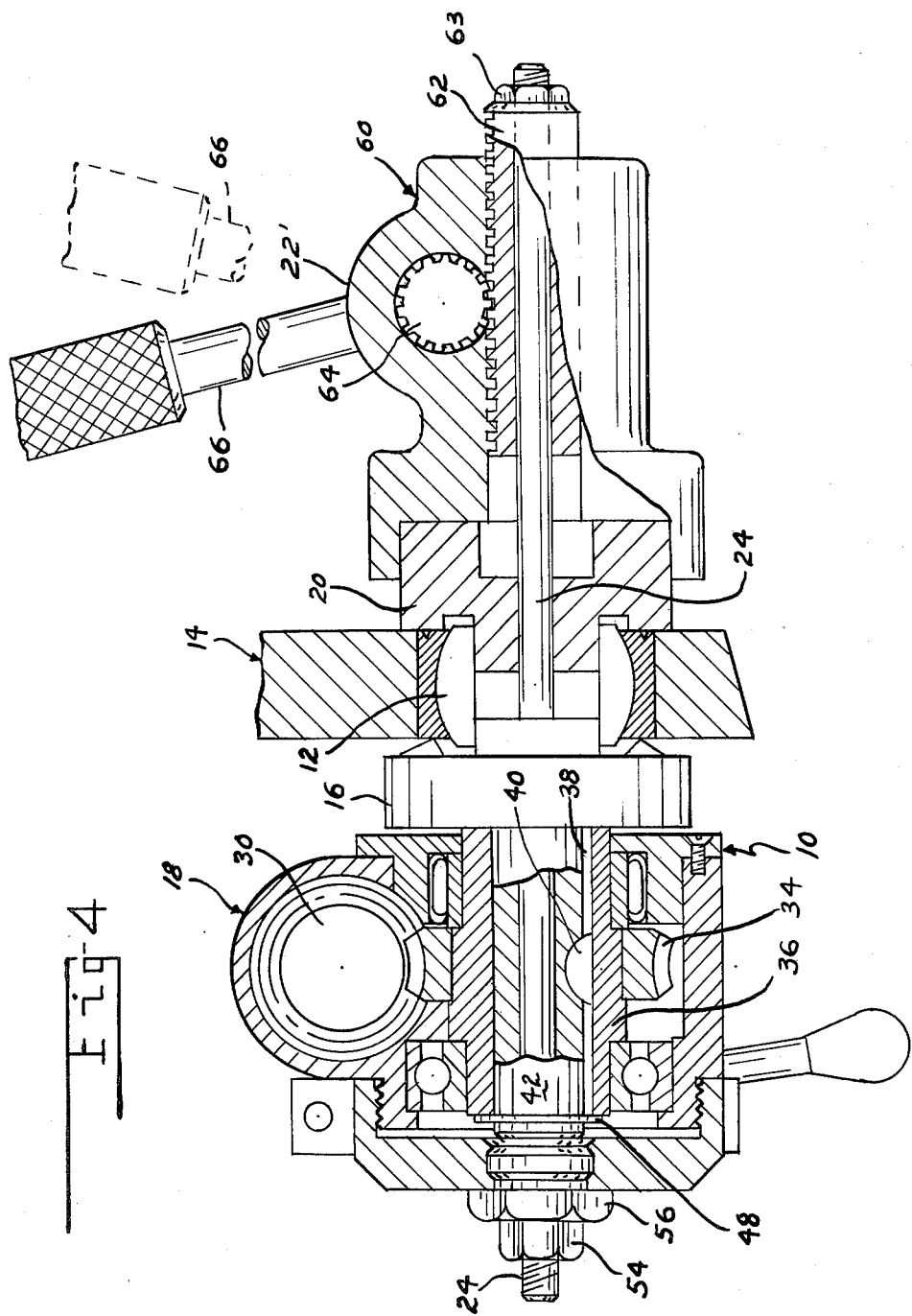

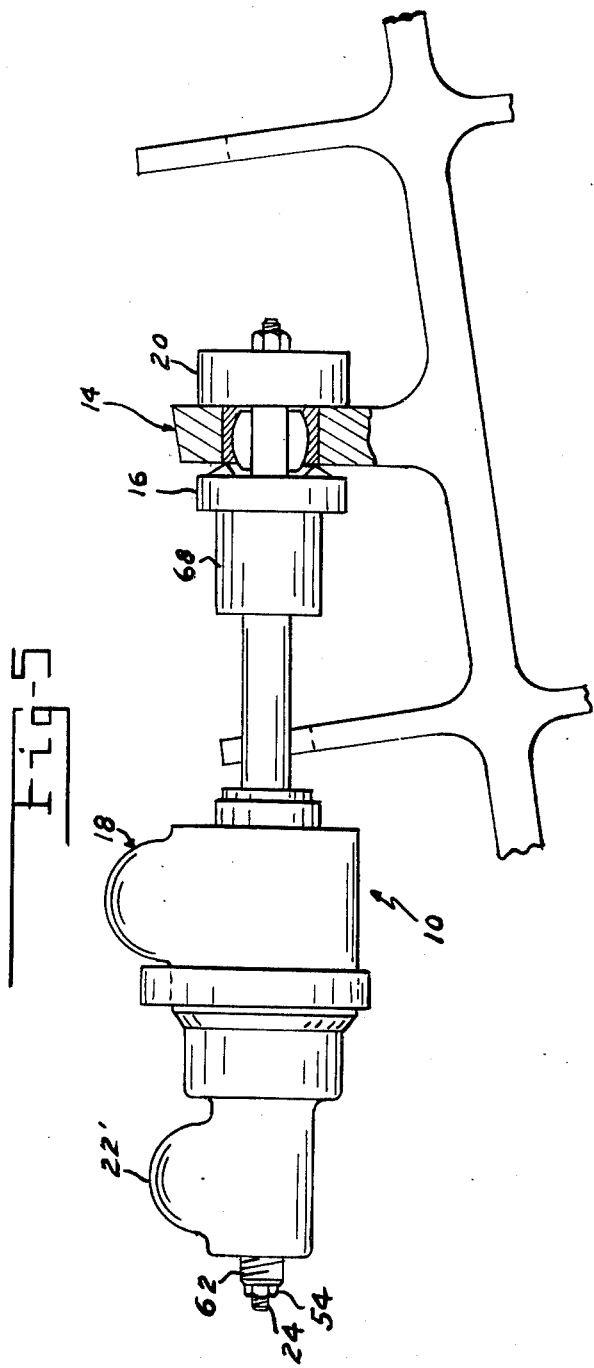

3,986,241

IN-PLACE BEARING STAKING DEVICE

RIGHTS OF THE GOVERNMENT

The invention described herein may be manufactured and used by or for the Government of the United States for all governmental purposes without the payment of any royalty.

BACKGROUND OF THE INVENTION

This invention relates to an apparatus for staking V-groove bearings. The staking of V-groove bearings is normally accomplished in a drill press with a roller staking tool. Bearings cannot be staked in this manner in large assemblies such as in air vehicles.

BRIEF SUMMARY OF THE INVENTION

According to this invention, a bearing staking device is provided which will permit the in place staking of bearings in large assemblies. A conventional roller staking tool is clamped to the part by means of a draw bar or other clamping means. An air motor worm drive unit rotates the staking tool as the staking tool is drawn toward a backup tool by a feed mechanism.

IN THE DRAWINGS

FIG. 2 is a partially schematic sectional view of the device of FIG. 1, taken along the line 2—2.

FIG. 4 shows another embodiment of the device shown in FIG. 2.

FIG. 5 shows a different arrangement of parts for the bearing staking device of FIGS. 1–4.

DETAILED DESCRIPTION OF THE INVENTION

Figure 1:
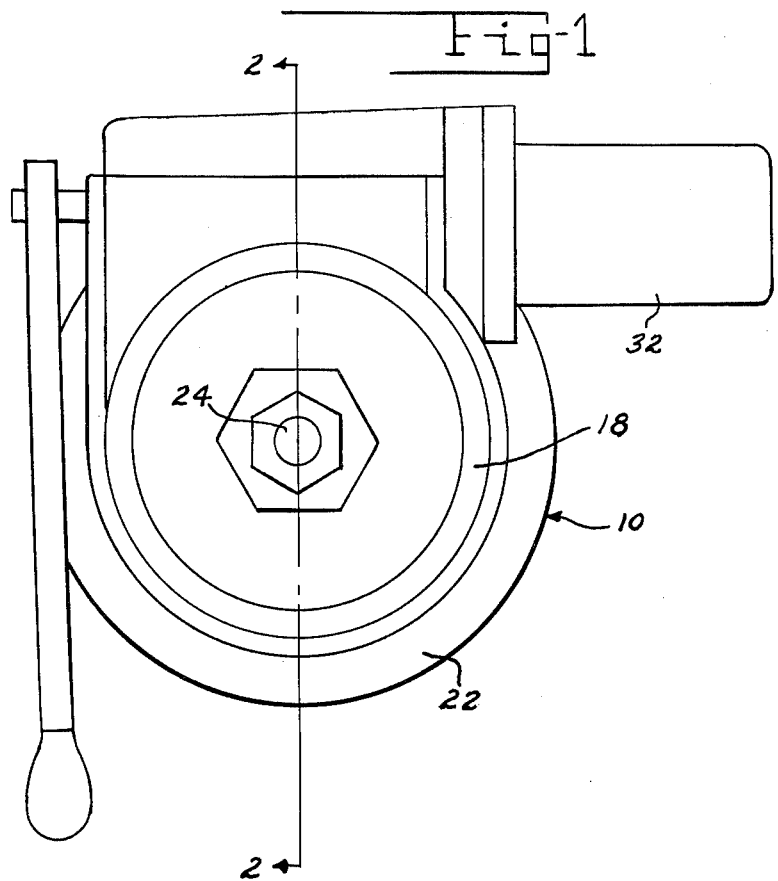
FIG. 1 is an end view of an in place bearing staking device according to the invention.

Reference is now made to FIGS. 1 and 2 of the drawing which show a staking device 10 for staking a bearing 12 in a large assembly part 14.

The staking device 10 has a conventional roller type staking tool 16, such as may be acquired from Rex Chainbelt Inc., a staking tool drive unit 18, a backup tool 20, a feed unit 22 and a draw bar 24. The draw bar 24 passes through the drive unit 18, the staking tool 16, the bearing 12, the backup tool 20 and engages a piston 26 in feed unit 22.

The drive unit 18 has a worm 30 which is driven by an air motor 32, shown in FIG. 1. The work 30 drives a worm gear 34, which is secured to a sleeve member 36 by means of a key or spline, not shown. The sleeve member 36 has a slot 38 for receiving a Woodruff key 40.

Figure 3:
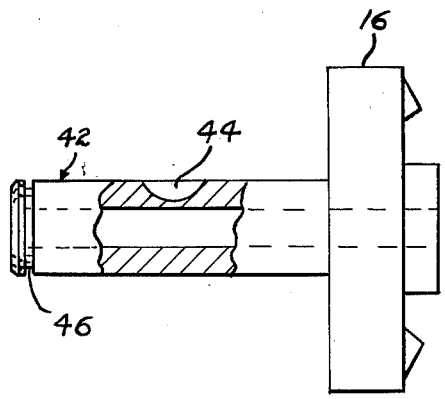
FIG. 3 is a partially cut away view of the staking tool used in the device of FIGS. 1 and 2.

The shaft 42 of a conventional roller staking tool 16 is modified, as shown in FIG. 3, to provide a slot 44 for Woodruff key 40. The shaft 42 also is provided with a slot 46 for receiving a snap ring 48 to retain the staking tool 16 in the sleeve 36.

As the staking tool 16 is driven by the drive unit 18, the drive unit and staking tool is drawn toward the backup tool 20 by the feed unit 22. Compressed air is supplied to a sealed chamber 50 on one side of piston 26 in the feed unit 22 through inlet 52. Movement of the piston 26 provides a pull on the draw bar 24 to move the staking tool 16 toward the backup tool 20. The portion of unit 22 on the opposite side of piston 51 has an opening 53 to the atmosphere. After the bearing is staked, the apparatus can be removed from the engine part by removing nuts 54 and 56 from the draw bar after which the drive unit 18 and staking tool 16 can be slid off of the draw bar. The feed unit 22, draw bar 24 and backup tool 20 can then be removed from the other side of the part 14.

A hand operated feed unit 22' could be substituted for the pneumatically operated unit as shown in FIG. 4. In this device, the draw bar is connected to a rack and pinion feed mechanism 60. The rack 62 is held on the draw bar 24 by means of nut 63. The pinion 64 is operated by means of a feed handle 66. A torque wrench could be substituted for handle 66.

The parts need not be assembled in the manner shown in FIGS. 2 and 4, but may be assembled in other configurations depending upon the particular application. One such arrangement is shown in FIG. 5 wherein the feed unit is positioned next to the drive unit. In this application, an adapter 68 is connected between the drive unit 18 and the staking tool 16. For this application, a longer draw bar than that used in the devices of FIGS. 2 and 4 would be provided. Other arrangements of parts and adapters could be provided for particular applications.

There is thus provided a staking device which permits in place staking of bearings in large assemblies.

I claim:

1. An apparatus for in place staking of a bearing in an assembly part, comprising: a roller staking tool; a backup tool; means for holding the staking tool and backup tool adjacent opposite sides of the bearing to be staked; means for rotating said staking tool and means for drawing the staking tool toward the backup tool as the staking tool is rotated.

2. The device as recited in claim 1 wherein said means for holding the staking tool and backup tool adjacent opposite sides of the bearing to be staked comprises a draw bar passing through the staking tool, the bearing and the backup tool.

3. The device as recited in claim 2 wherein said means for rotating said staking tool comprises: a worm drive assembly positioned on said draw bar and connected to said staking tool and an air motor adapted to drive said worm drive assembly.

4. The device as recited in claim 3 wherein said means for drawing said staking tool toward said backup tool comprises: a housing abutting said backup tool; a piston connected to said draw bar and forming a sealed chamber in said housing; means for supplying compressed air to said chamber for moving said piston to draw the staking tool toward the backup tool.

5. The device as recited in claim 3 wherein said means for drawing said staking tool toward said backup tool comprises: a housing abutting said backup tool; a rack, within said housing, connected to said draw bar; a pinion, within said housing, for moving said rack; and means connected to said pinion for rotating the pinion to thereby draw the staking tool toward the backup tool.

* * * * *